United States Patent [19]

Sherk

[11] 4,436,901
[45] Mar. 13, 1984

[54] HYDROCARBON WASH LIQUID FOR CATALYST SEPARATION

[75] Inventor: Fred T. Sherk, Bartlesville, Okla.

[73] Assignee: Phillips Petroleum Company, Bartlesville, Okla.

[21] Appl. No.: 350,851

[22] Filed: Feb. 22, 1982

[51] Int. Cl.³ .......................... C08F 6/10; C08F 6/06
[52] U.S. Cl. .................................. 528/498; 528/501; 528/503
[58] Field of Search ............... 528/498, 499, 501, 502, 528/503

[56] References Cited

U.S. PATENT DOCUMENTS

| | | | |
|---|---|---|---|
| 2,943,082 | 6/1960 | Cottle | 528/501 |
| 3,219,647 | 11/1965 | Dietz | 528/498 |
| 3,262,922 | 7/1966 | Payne | 528/498 |
| 3,285,899 | 11/1966 | Houser | 528/498 |
| 3,324,093 | 6/1967 | Alleman | 528/498 |
| 3,341,622 | 9/1967 | Leibson | 528/498 |
| 3,470,070 | 9/1969 | Heckart | 528/501 |
| 3,476,736 | 11/1969 | Kahre | 528/501 |

Primary Examiner—C. A. Henderson

[57] ABSTRACT

An improved polymerization process wherein vapors from a flash zone are condensed and used as wash liquid in a polymer washing zone and optionally a sidestream from a monomer fractionation zone is also used as wash liquid.

5 Claims, 1 Drawing Figure

HYDROCARBON WASH LIQUID FOR CATALYST SEPARATION

BACKGROUND OF THE INVENTION

The present invention relates to the recovery of a solid polymer from a liquid-solids slurry. In another aspect, the present invention relates to the polymerization and recovery of polymers of mono-1-olefins. In yet another aspect, the present invention relates to the recovery and reuse of polymerization diluent.

Various reactions for polymerizing mono-1-olefins are described in the literature, and the polymerizations are usually carried out in the presence of catalysts. In particular preferred processes, the polymerization is conducted under such conditions that the polymerization effluent comprises a liquid-solids slurry. Typically, in such processes, the polymerization effluent comprising solid polymer and liquid diluent is subjected to a washing step. In the washing step, the polymer solids are contacted with a wash liquid which aids in separating the catalyst residue from the polymer. The wash liquid containing catalyst residue and catalyst extractant, if employed, is separated from the polymer and subjected to purification so that it can be reused. The solid polymer is then passed to a flash zone wherein liquid that is associated with the polymer is removed by being flashed to vapor and the solid polymer is recovered. Examples of such processes are disclosed in U.S. Pat. Nos. 3,219,647; 3,324,093; 3,280,090; 3,285,899; and 3,454,545, the disclosures of which are incorporated herein by reference.

Typically in such processes in the past, the wash liquid and the vapors from the flash zone have been sent to a fractionation zone wherein diluent, which is often the same as both the monomer and the wash liquid, is purified and recycled for reuse in the process. Generally, the wash liquid and the vapors from the flash zone have been passed to the same fractionation zone and a portion of the fractionator overhead has been condensed and used as wash liquid.

An object of the present invention is to provide a method of reusing the wash liquid which can result in very significant utility savings.

Still another object of the present invention is to provide a process for recovering polymer and diluent which can use less expensive fractionation equipment than must be employed when both the wash liquid and the flash vapors are subjected to fractionation.

In yet another aspect the present invention provides an integrated process which can result in a reduction in the losses of monomer that occur during the further steps invovled in recovering the polymer.

SUMMARY OF THE INVENTION

In accordance with the present invention, vapors from the flashing zone are passed from the flashing zone to a condensing zone wherein said vapors are condensed to liquid having substantially the same hydrocarbon composition as the overhead vapors from the flash zone and at least a portion of the liquid obtained from the condensing zone is passed to the wash zone where said liquid serves as at least a portion of the wash liquid supply.

DETAILED DESCRIPTION OF THE INVENTION

Figure 1:
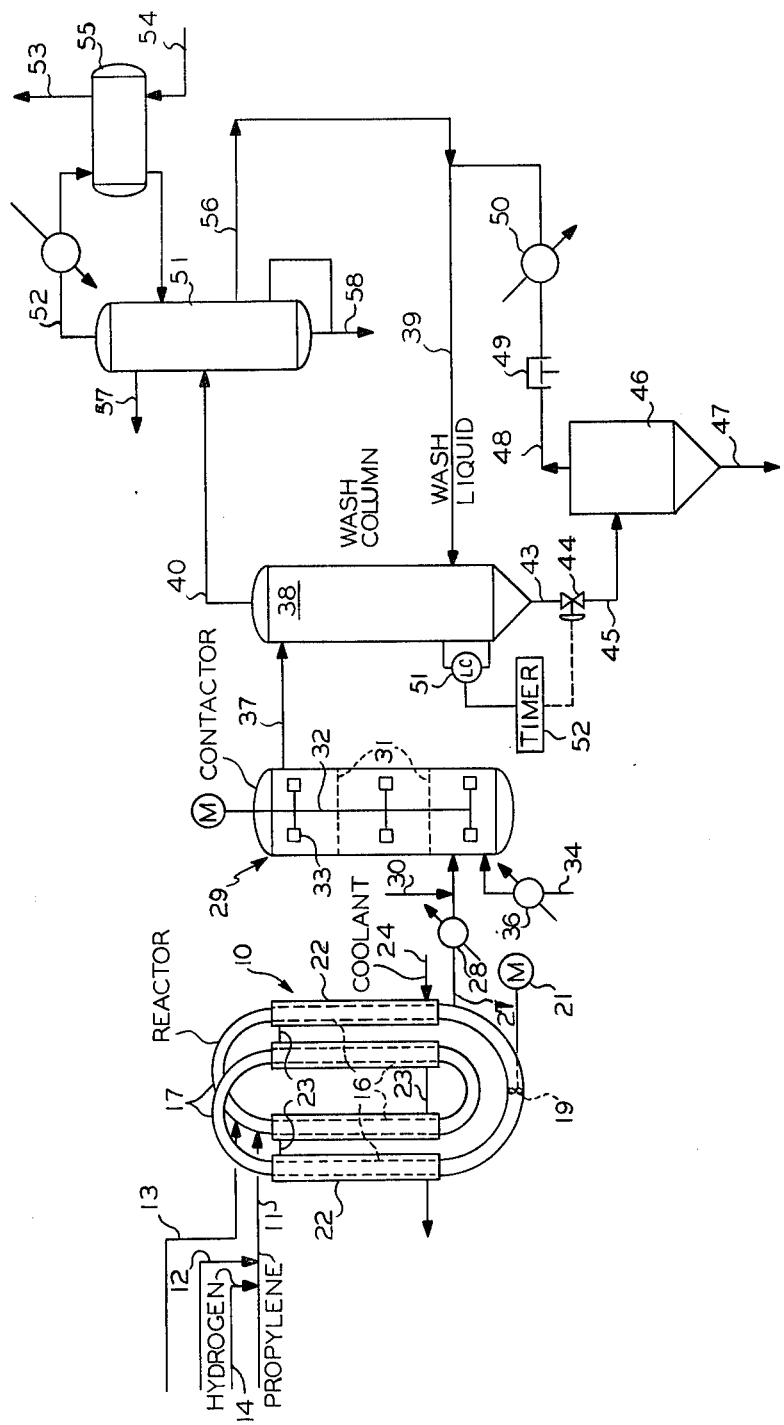

The solids polymers which are treated in accordance with the present process are generally prepared from mono-1-olefins. The invention is broadly applicable to the treatment of polymers of mono-1-olefins having from 2 to 8 carbon atoms per molecule. Examples of such monomers include ethylene, propylene, 1-butene, 1-pentene, 3-methyl-1-butene, and the like. The term "polymers" include both homopolymers and copolymers of said mono-1-olefins.

Since a wide variety of catalyst systems can be employed, it is not intended to limit this invention to any particular catalyst system. Catalyst systems which are suitable for use in the present invention include those which are capable of polymerizing a mono-1-olefin under conditions such that a polymerization effluent comprising solid polymer in liquid is produced. An example of such catalyst systems include those which comprise an organometallic compound and a metal salt. Examples of such catalysts include those which comprise (1) a compound having the formula $R_nMX_m$, wherein R is an alkyl, cycloalkyl, or aryl radical or combinations of these radicals, such as alkaryl, aralkyl and alkyl-cycloalkyl, X is a hydrogen or a halogen, including chlorine, bromine, iodine and fluorine, M is aluminum, gallium, indium or thallium, n is from 1 to 3, inclusive, m is from zero to 2, inclusive, and the sum of m and n is equal to the valence of the metal M and (1) a halide of a metal of Group IV-B, V-B, VI-B or VIII. The hydrocarbon radicals which can be substituted for R in the aforementioned formula include radicals having up to about 20 carbon atoms each. Radicals having 10 carbon atoms or less are preferred since the resulting catalyst composition has a greater activity for initiating the polymerization.

A preferred catalyst system employed in the polymerization of propylene in a mass system comprises diethylaluminum chloride and a complex having the approximate formula $3TiCl_3 \cdot AlCl_3$ and prepared by the reaction of Al with $TiCl_4$. The amount of titanium trichloride complex employed is generally in the range of $1.5 \times 10^{-4}$ to $10 \times 10^{-4}$ gm/gm of monomer.

Although not essential to the conduct of the polymerization, it is often desirable to carry out the polymerization in the presence of elemental hydrogen. When so operating, hydrogen is added in an amount sufficient to provide from 0.15 to 0.40 mol percent hydrogen in the liquid mono-1-olefin phase in the polymerization zone. By operating in this manner, the productivity of the catalyst is increased and certain properties of the polymer, e.g., flexural modulus, are improved.

Subsequent to the polymerization step, the polymer slurry is subjected to a washing step. Typically prior to the washing step, a catalyst extractant and/or catalyst deactivator is added to the polymer slurry. Numerous such agents are known in the art. Some examples include aliphatic alcohols, carboxylic acids and hydroxy-substituted carboxylic acids, anhydrides of said acids and mixtures thereof. A particularly preferred type of extractant are the diketones, especially the alpha-diketones and beta-diketones.

The washing step can be conducted in any suitable manner. In a particularly preferred embodiment, the polymer slurry is passed into a washing zone wherein the solid polymer is contacted countercurrently with a wash liquid which is maintained in the liquid phase.

Typically, the wash liquid is a hydrocarbon. Examples include aliphatic hydrocarbons containing from 3 to 7 carbon atoms per molecule. Examples of such hydrocarbons include pentane, heptane, and the like; however, it is preferred for the wash liquid to be the same as a monomer used in the polymerization.

It is noted that while it is not essential that all the vapors from the flash step be condensed, it is preferred that at least 90 volume percent, more preferably at least 98 volume percent, be condensed.

A further understanding of the present invention will be provided by referring to the drawing which is a process flow diagram illustrating a preferred embodiment of the invention.

While the drawing is described with regard to a process in which propylene is polymerized with a specific catalyst system employing a monomer in liquid phase without the addition of more than small amounts of an inert diluent, it is to be understood that it is not intended to limit the invention to this specific embodiment. As used herein, the term "mass polymerization" is used to designate a polymerization which is conducted with the monomer in liquid phase and without the addition of more than small amounts of an inert diluent.

Referring now to the drawing, propylene is charged to reactor 10 through line 11. Prior to use in the polymerization, the propylene is treated by conventional methods in order to remove contaminants such as oxygen, $CO_2$ and moisture. It is also the usual practice to purge the reactor with an inert gas, such as nitrogen, in order to remove such contaminants prior to commencement of the polymerization. Lines 12 and 13, respectively, provide means for charging the catalyst ingredients, namely, the titanium trichloride complex and the diethylaluminum chloride, to the system. It is noted that line 12 is connected to line 11 so that the titanium trichloride enters the reactor along with the liquid propylene. As mentioned above, it has been found to be advantageous to conduct the polymerization in the presence of hydrogen. As shown, the hydrogen enters the propylene feed line through line 14 and is charged to the reactor along with the liquid propylene.

The reactor illustrated in the drawing is a loop-type reactor which comprises two loops. Each loop is composed of two straight legs 16 which may conveniently be in the form of elongated pipe sections. The ends of the legs of the reactor are conveniently interconnected by means of ells 17 so as to provide a continuous flow path through the reactor. The reactor is furnished with an impeller 19 which is operatively connected to a turbine 21. The operation of the impeller provides motive force for flowing the materials through the loop reactor. The vertical legs of the loop reactor are encompassed by heat exchange jackets 22 which are interconnected by means of lines 23. Line 24 connected to the heat exchange jacket associated with one of the outer legs provides means for introducing a coolant such as water. The coolant flows through the heat exchange jackets at a temperature and at a rate such as to maintain a desired polymerization temperature in the reactor. The coolant is removed from the reactor system by means of line 26 which is connected to the other outer leg of the reactor. Although it is often preferred to employ a loop-type reactor, it is to be understood that the polymerization can be conducted in any suitable polymerization zone, such as in a closed reaction vessel provided with a stirring means.

The conditions employed in conducting the polymerization will vary somewhat depending upon the mono-1-olefin utilized. The polymerization temperature is generally in the range of zero to 160° F. In the case of propylene, a particularly suitable temperature range in reactor 10 is in the range of 90° to 160° F. In general, the polymerization is conducted at a temperature such that solid polymer in particle form is obtained in the polymerization. The actual amount of solid polymer formed is also dependent upon the particular catalyst system used. It has been found that the preferred catalyst system as described above produces a very high percentage of solid polymer with a minimum formation of soluble polymer. The pressure employed in reactor 10 is sufficient to maintain the reactants in the liquid phase. In the case of the polymerization of propylene, the lower limit of pressure is about 225 psig at a polymerization temperature of about 90° F. The residence time in reactor 10 can range from about 30 minutes to about 9 hours, with a residence time of about 2 hours being preferred.

The effluent stream recovered from reactor 10 through line 27 comprises solid polymer, catalyst residues, soluble polymer and liquid propylene. The stream usually contains in the range of 25 to 65, preferably 35 to 50, weight percent solid polymer. After removal of the effluent through line 27, it is passed through indirect heat exchange means 28 prior to introduction into a lower portion of contact tank 29. In the heat exchange means, the effluent is heated to a temperature which is slightly higher than the temperature employed in reactor 10. Although the effluent may be introduced directly into the contact tank without prior heating, it has been found that catalyst removal is improved if the temperature maintained in the contact tank is slightly higher than the polymerization temperature. In the case of polypropylene, the effluent in line 27 is usually heated to a temperature in the range of 100° to 170° F. The pressure in contact tank 29 is sufficient to maintain the propylene in the liquid phase, and it is usually substantially the same as the pressure in reactor 20. Line 30 provides means for introducing an extractant, e.g., acetylacetone, into the contact tank. Line 30 is connected to line 27 so that the acetylacetone enters the contact tank along with the effluent. In some cases, hydrogen chloride may be evolved and it may be desirable to add propylene oxide or the like to the contact tank.

In contact tank 29 the acetylacetone is thoroughly mixed with the effluent from reactor 10. The contact tank depicted in the drawing, comprises an enclosed vessel having baffle members 31 disposed in the upper and lower portion of the tank. The baffle members are attached to the walls of the tank and are each provided with a central opening through which the shaft or stirring means 32 passes. The positioning of the baffle members in this manner in effect divides the contact tank into upper, intermediate and lower sections. Each of these sections is provided with a stirrer 33 which is attached to the shaft of stirring means 32. It has been found that particularly good contact is obtained between the acetylacetone and the effluent from reactor 10 when utilizing this specific structure.

The extractant, e.g., acetylacetone, and propylene oxide, if desired, can be introduced into line 27 undiluted, or it can be added as a solution in a hydrocarbon which is inert to the reactants. The amount of treating agent added in this manner may range from 1 to 5 times the stoichiometric equivalent, based on the amount of catalyst present. The contact time in contact tank 29 can vary within rather wide limits, e.g., from 5 minutes to 1 hour. However, it is usually preferred to use a contact time in the range of 20 to 30 minutes.

As previously mentioned, heat exchanger 28 provides means for heating the effluent from reactor 10 prior to its introduction into contact tank 29. As an alternative, line 34 provided with indirect heat exchange means 36 furnishes a means for increasing the temperature in the contact tank. When using this procedure, a low-boiling hydrocarbon is heated in heat exchange 36 and then passed into the contact tank in order to raise the temperature therein to a desired level. As the low-boiling hydrocarbon it is usually preferred to employ the monomer, e.g., propylene or a paraffinic hydrocarbon containing from 4 to 6 carbon atoms per molecule, such as n-pentane or n-hexane. Contactor 29 may also be heated by means of a jacket surrounding same through which a heating medium is circulated.

The treated effluent is withdrawn from an upper portion of contact tank 29 through line 37 and is then passed into the upper portion of wash column 38. The treated effluent containing the extractant and catalyst residues is preferably contacted countercurrently with liquid propylene introduced through conduit 39 and removed through conduit 40 with any polymer fines carryover being removed through a filter. Some soluble polymer is removed by the liquid propylene. The liquid is then passed to a suitable treating zone for the removal of the extractant so that the liquid propylene may be recycled. Although various light hydrocarbons, particularly paraffinic hydrocarbons containing from 4 to 6 carbon atoms per molecule, such as normal pentane, are employable as the wash liquid, it is preferred to utilize the liquid monomer, such as propylene. Furthermore, because of the improved results obtained with propylene, it is not to be implied that the use of propylene is necessarily equivalent to the use of other materials such as normal pentane for the wash liquid. However, other wash liquids are operable including a mixture of the liquid monomer and a light hydrocarbon as well as mixtures of light hydrocarbons. It is only necessary that the wash liquid be provided at a velocity and a volume sufficient to remove substantially all of the remaining traces of extractant and catalyst residues contained in the slurry of polymer, preferably for a period of time in the range of five minutes to one hour. The pressure maintained in the wash column is sufficient to maintain the liquids, for example liquid propylene, in the liquid phase, preferably in the range of 50 to 500 psia. A slurry of solid polymer in particle form and liquid propylene is then withdrawn from the bottom portion of the wash column through conduit 43 and valve 44 which operates as a pressure letdown valve into flash tank 46 wherein the propylene flashes off.

The solid polymer in particle form containing residual amounts of propylene is withdrawn from the bottom of flash tank 46 via line 47 and recovered and processed in a conventional manner.

The vapors formed in flash tank 46 are taken off via line 48 and condensed by being passed through a compressor 49 and an indirect heat exchange zone 50. The condensed liquid comprising propylene and propane is then introduced into conduit 39 which provides the wash liquid for column 38.

The overhead stream from wash tank 38 contains propylene, propane, soluble polymer, catalyst residues and small amounts of solid polymer. The overhead stream is passed to a fractionation column 51 allowing for the separation of the various components as desired. Typically, before being passed to fractionator 51, the overhead from the wash column may be passed through a cyclone, not shown, which removes solid polymer contained therein. The solid polymer recovered from the cyclone is generally returned to the wash tank or otherwise recovered. In another embodiment, a filter could be employed between the wash column and the fractionation column 51 to replace the cyclone.

In the embodiment illustrated in the drawing, the overhead from the fractionation column 51 is passed via line 52 to a condenser wherein propylene contained therein is condensed to a liquid which is passed to vessel 55. Hydrocarbons lighter than propylene are vented via line 53. The remaining liquid is recycled as reflux to fractionation column 51. Fresh propylene from a storage vessel not shown is introduced into vessel 55 via line 54 to provide make up propylene for the integrated process. The technique eliminates the need for the separate degassing column that has normally been used to remove light hydrocarbons from the propylene makeup. A substantially pure propylene stream is removed from an upper portion of column 51 via line 57 for reuse in the polymerization.

A liquid sidedraw stream is removed from column 57 via line 56 and combined with the liquid that resulted upon the condensation of the vapors in line 48. The combined streams pass via line 39 as makeup wash liquid for the wash column. The sidedraw stream is withdrawn at a level such that it will contain substantial amounts of propane as well as propylene. Preferably, the weight ratio of propane to propylene in the sidestream is greater than it was in line 40.

In order to further illustrate the present invention and its advantages, a calculated material balance showing the quantities of various constituents that would typically be present in a plant of the type illustrated that was producing 213,600 kilograms of polypropylene per day. These calculations are based upon the knowledge gained from prior art systems and state of the art engineering principles.

Although not shown in the drawing, typically there would be an accumulator vessel for the liquid produced in the condensing zone and an accumulator vessel for the liquid sidedraw from the fractionator, or at least a common accumulator vessel for both streams. It is within the scope of this invention to allow the venting of minor amounts of the components of the two liquids. Also although not shown in the drawing, generally before the liquids are passed back to the wash zone they would be passed through an adsorbent bed to prevent the buildup of water in the system.

TABLE I

| | Material Balance Summary Kilograms Per Day | | | | | | | | | | | |
|---|---|---|---|---|---|---|---|---|---|---|---|---|
| | Stream Line | | | | | | | | | | | |
| Component | 37 | 39 | 40 | 45 | 47 | 48 | 52 | 53 | 54 | 56 | 57 | 58 |
| Hydrogen | 42 | 1 | 42 | 1 | — | 1 | 64 | 41 | — | — | 1 | — |
| Nitrogen | 232 | 4 | 232 | 4 | — | 4 | 481 | 222 | — | — | 10 | — |
| Ethane | 268 | 53 | 268 | 53 | — | 53 | 3,535 | 65 | 65 | — | 268 | — |

TABLE I-continued

| | Material Balance Summary Kilograms Per Day | | | | | | | | | | |
|---|---|---|---|---|---|---|---|---|---|---|---|
| | Stream Line | | | | | | | | | | |
| Component | 37 | 39 | 40 | 45 | 47 | 48 | 52 | 53 | 54 | 56 | 57 | 58 |
| Propylene | 158,279 | 204,078 | 237,130 | 125,122 | 2,233 | 122,889 | 531,132 | 389 | 228,503 | 81,189 | 382,920 | 1,221 |
| Propane | 13,463 | 31,014 | 29,986 | 17,482 | 312 | 17,170 | 6,972 | 3 | 1,611 | 13,844 | 14,217 | 542 |
| Hexane | 739 | 128 | 867 | — | — | 128 | — | — | — | — | — | 867 |
| Soluble Polymer | 4,272 | — | 4,270 | — | — | — | — | — | — | — | — | 4,270 |
| Polypropylene | 213,600 | — | — | 213,493 | 213,493 | — | — | — | — | — | — | — |
| Total | 390,895 | 235,278 | 272,795 | 356,155 | 216,038 | 140,245 | 542,184 | 720 | 230,179 | 95,033 | 397,416 | 6,900 |

As indicated by Table I, such a process would have about 140,000 kg/day of about 88 weight percent purity propylene vapors flashed from flash tank 46 into line 48. In the prior art, processes of this vapor would have been sent to the monomer purification column 51. By compressing the vapor and directly reusing it as wash liquid, the load on the column is reduced by about a third. Thus, the invention will allow one to use much smaller fractionating columns and to reduce the utilities required in the reboiler. Alternatively, if the invention is applied to a pre-existing plant that already has a large capacity fractionation column, it may be possible to use the one column as the monomer purification means for a plurality of polymerization units.

It will be noted that propylene stream 57 that is to provide propylene for the polymerization step contains a significant amount of propane as well as propylene. This is a well recognized phenomena resulting from the close boiling points of the two hydrocarbons. Naturally, this propane will be carried through other steps of the process. By condensing the overhead from the flash zone and recycling the liquid directly to the wash column, there will be a greater buildup of propane in the wash column than if the vapors from the flash column were subjected to fractionation as has been done in the past.

The buildup of propane in the wash column an in turn lead to an additional benefit. It will be noted that even in the prior art techniques, there would be some amounts of liquid or vapors adsorbed or occluded on the polymer that is removed from the flash zone via line 47. Much of this liquid including expensive monomer has been subject to loss during the subsequent processing steps on the polymer. The accumulation of propane in the wash liquid as a result of the present invention will substitute propane losses for at least some of the losses of monomer.

The withdrawing of the sidestream containing both propane and propylene via line 56 and the recycling of this stream to the wash zone further increases the propane accumulation which in turn would lead to further reductions in monomer loss downstream of line 47.

In prior art processes, the overhead from the flash column has been passed to the fractionation column and the overhead of line 57 comprising about 96 weight percent propylene would have been used as wash liquid in the wash column 38. In contrast, the wash liquid provided via line 39 in accordance with this invention contains only about 87 weight percent propylene.

As will be evident to those skilled in the art, many variations and modifications of this invention can be made without departing from the spirit and scope of the invention.

What is claimed is:

1. In a continuous propylene mass polymerization wherein liquid propylene is contacted in a polymerization zone with a suitable catalyst in the presence of propane under conditions so as to form solid polymer, effluent from said polymerization zone comprising propylene and propane is contacted in a wash column with a wash liquid to separate catalyst residues therefrom, used wash liquid from the wash column is subjected to fractionation to recover propylene therefrom, washed polymer is recovered from the wash column and passed to a flashing zone wherein liquid is flashed from the solid polymer, the improvement comprising passing overhead vapors comprising propylene and propane from the flash zone to a condensing zone wherein said vapors are condensed to a liquid having substantially the same hydrocarbon composition as the overhead vapors from the flash zone and passing at least a portion of the liquid obtained from the condensing zone to the wash zone where said liquid serves as at least a portion of the wash liquid supply and a fractionation sidestream comprising propylene and propane is also employed as wash liquid.

2. A process according to claim 1 wherein the major portion of the wash liquid that is supplied to the wash column consists of the liquid obtained by condensing overhead vapors from the flash zone.

3. A process accoding to claim 1 wherein the weight ratio of propane to propylene in said sidestream is greater than it was in the used wash liquid.

4. A process according to claim 3 wherein the major portion of the wash liquid employed in the wash column consists of the liquid produced in said condensing zone.

5. A process according to claim 4 wherein at least 90 volume percent of the overhead vapor from the flash zone is passed directly to said condensing zone.

* * * * *